United States Patent
Irie et al.

(10) Patent No.: US 7,032,559 B2
(45) Date of Patent: Apr. 25, 2006

(54) CAST-IN OBJECT PLATE MEMBER, PARTITION PLATE FOR INTAKE PORT, INTAKE-PORT FORMING SAND CORE AND CYLINDER HEAD

(75) Inventors: Seiji Irie, Tochigi-ken (JP); Kenji Yageta, Tochigi-ken (JP); Masao Suzuki, Yokosuka (JP); Toshiyuki Nishida, Matsuzaka (JP)

(73) Assignees: Nissan Motor Co., Ltd., Yokohama (JP); Aichi Machine Industry Co., Ltd., Nagoya (JP)

( * ) Notice: Subject to any disclaimer, the term of this patent is extended or adjusted under 35 U.S.C. 154(b) by 0 days.

(21) Appl. No.: 10/967,138

(22) Filed: Oct. 19, 2004

(65) Prior Publication Data

US 2005/0081813 A1    Apr. 21, 2005

(30) Foreign Application Priority Data

Oct. 20, 2003    (JP)    ............................. 2003-359941

(51) Int. Cl.
*F02F 1/00*    (2006.01)

(52) U.S. Cl. ............................. 123/193.5; 123/188.14

(58) Field of Classification Search ............. 123/193.5, 123/188.14, 308, 306; 29/888.01
See application file for complete search history.

(56) References Cited

U.S. PATENT DOCUMENTS

| 5,277,160 | A | 1/1994 | Choma et al. |
| 6,877,478 | B1 * | 4/2005 | Kim et al. ................. 123/306 |
| 2002/0078921 | A1 | 6/2002 | Kim et al. |

FOREIGN PATENT DOCUMENTS

| DE | 198 03 867 A1 | 8/1999 |
| EP | 1 336 750 A2 | 8/2003 |
| EP | 1 344 926 A2 | 9/2003 |
| JP | 62-050064 A | 3/1987 |
| JP | 2001-193469 A | 7/2001 |

OTHER PUBLICATIONS

U.S. Appl. No. 10/967,144, Katou et al., filed Oct. 19, 2004.
U.S. Appl. No. 10/968,004, Yageta et al., filed Oct. 20, 2004.

* cited by examiner

*Primary Examiner*—Henry C. Yuen
*Assistant Examiner*—Hyder Ali
(74) *Attorney, Agent, or Firm*—Foley & Lardner LLP

(57) ABSTRACT

A partition plate (cast-in object plate member) is preliminarily set in an intake-port forming sand core, by which an intake port of a cylinder head is molded, and cast in during cast molding of the cylinder head for partitioning the intake port. The partition plate has both distal ends, spaced apart in a longitudinal direction, one of which corresponds to an intake-side distal end at which an acute-angled end face is formed to induce core breaking in a port core at an area closer to the intake-side distal end.

4 Claims, 9 Drawing Sheets

CAST-IN OBJECT PLATE MEMBER, PARTITION PLATE FOR INTAKE PORT, INTAKE-PORT FORMING SAND CORE AND CYLINDER HEAD

CROSS REFERENCE TO RELATED APPLICATION

This application claims benefit of priority under 35 U. S. C. § 119 to Japanese Patent Application No. 2003-359941, filed on Oct. 20, 2003, the entire contents of which are incorporated by reference herein.

BACKGROUND OF THE INVENTION

1. Field of the Invention

The present invention relates to a cast-in object plate member, a partition plate for intake port, an intake-port forming sand core and a cylinder head.

2. Description of the Related Art

Modern engines have cylinders each with a cylinder head formed with intake ports in each of which a partition plate (tumble plate) is located. An airflow control valve, disposed at an intake-side distal end of the intake port, is controlled to allow the partition plate to deflect a stream of intake air to be introduced into a cylinder bore from the intake port for promoting tumble flow (vortex flow) in the cylinder bore for thereby achieving improvement in fuel consumption (see related art: Japan Unexamined Patent Publication No. 2001-193469)

Also, throughout the specification, one side of a "partition plate" from which intake air, such as air and fuel gas, flows in is referred to an "intake-side" and the other side opposite to the one side, i.e., a cylinder bore side is referred to as a "cylinder-side".

SUMMARY OF THE INVENTION

In cast molding a cylinder head, it has been a general practice for a metallic partition plate to be set in an intake-port forming sand core to allow the partition plate to be partially cast in by molten metal during cast molding. During the cast molding of the cylinder head, the sand core and the partition plate thermally expand due to heat transmitted from molten metal. Here, a coefficient of thermal expansion of the partition plate remarkably greater than that of the sand core. For this reason, it is feared that the partition plate deforms the sand core. Further, due to thermal expansion of the partition plate, another fear occurs in the occurrence of the partition plate being displaced during cast molding of the cylinder head and in addition to this, probabilities occur in a cylinder head, as a cast product after completing the cast molding, wherein looseness of the partition plate occurs in the cast product.

Therefore, depending upon areas at which burrs occur, not only extremely troublesome deburring work is required in subsequent machining step but also the presence of positional displacement of the partition plate or looseness of the partition plate inside the cast product result in deterioration in quality of the cast product. Accordingly, adequate consideration must be taken into consideration to count for thermal affects acting on the partition plate.

With the partition plate disclosed in the related art, the partition plate is formed in a wave profile to provide a measure for counting deformation caused by thermal expansion occurring when the partition plate is cast in during cast molding of the cylinder head. However, even though the partition plate in the wave profile is effective to absorb deformation resulting from thermal expansion in a radial direction of the intake port, it is hard to absorb deformation resulting from thermal expansion in an axial direction (along a longitudinal direction of the intake port). Consequently, it is hard to cause burrs, resulting from cracking of the core due to a difference in the amounts of thermal expansion, to occur in a limited area, and an issue arises in a difficulty of sufficiently minimizing positional displacement of the partition plate and the occurrence of looseness in the cast product.

The present invention has been completed with the foregoing in mind and has an object to allow burrs, resulting from cracking of a core, to generate in a limited area for thereby providing an ease of performing deburring work in subsequent processing.

To achieve the above object, the present invention provides a cast-in object plate member, which is preliminarily set in a sand core to be cast in during cast molding of a cast product, comprising: a first distal end; a second distal end; a pair of side edges continuous with the first and second distal ends and cast in by molten metal when cast molding is performed; and a partitioning section formed between the side edges and having the first and second distal ends; wherein at least one of the first and second distal ends includes an acute-angled end face to promote breaking in the sand core.

Further, to achieve the above object, the present invention provides a partition plate, for an intake port of a cylinder head, which is preliminarily set in an intake-port forming sand core and cast in during cast molding of the cylinder head to partition the intake port into a plurality of ports, the partition plate comprising: an intake-side distal end; a cylinder-side distal end; a pair of side edges continuous with the intake-side distal end and the cylinder-side distal end and cast in by molten metal when cast molding is performed; and a partitioning section formed between the side edges and having the intake-side distal end and the cylinder side distal end; wherein at least one of the intake-side distal end and the cylinder-side distal end includes an acute-angled end face to promote breaking in the intake-port forming sand core.

Furthermore, to achieve the above object, the present invention provides an intake-port forming sand core, for forming an intake port of a cylinder head, which is set in a casting mold for cast molding the cylinder head, comprising: a sand core body; and a partition plate, for the intake port of the cylinder head, which is preliminarily set in the sand core body and cast in during cast molding of the cylinder head to partition the intake port into a plurality of ports; wherein the partition plate includes: an intake-side distal end; a cylinder-side distal end; a partitioning section formed between the intake-side distal end and the cylinder side distal end; a pair of side edges protruding outward from the partitioning section to be cast in by molten metal when the cast molding is performed; and wherein at least one of the intake-side distal end and the cylinder-side distal end of the partitioning section includes an acute-angled end face to promote breaking in the sand core body.

Moreover, to achieve the above object, the present invention provides a cylinder head for an engine, comprising: a cylinder head body having an intake port; a partition plate that is preliminarily set in an intake-port forming sand core and cast in during cast molding of the cylinder head to partition the intake port into a plurality of ports; and wherein the partition plate has distal ends in a longitudinal direction and includes an acute-angled end face formed in one of the distal ends at a position closer to the intake port and located in the intake-port forming sand core; and side edges continuous with the distal ends and adapted to be cast in by molten metal to be integrally cast with the cylinder head.

DETAILED DESCRIPTION OF THE PREFERRED EMBODIMENTS

Hereinafter, various embodiments according to the present invention will be described with reference to the accompanying drawings.

First, description is made of a cylinder head 10, having a partition plate 100 for an intake port 14, on which the present invention is premised. Also, throughout the following description, the partition plate 100 for the intake port 14 is also referred to as a "tumble plate 100". This tumble plate corresponds to a cast-in object plate member.

Figure 1:
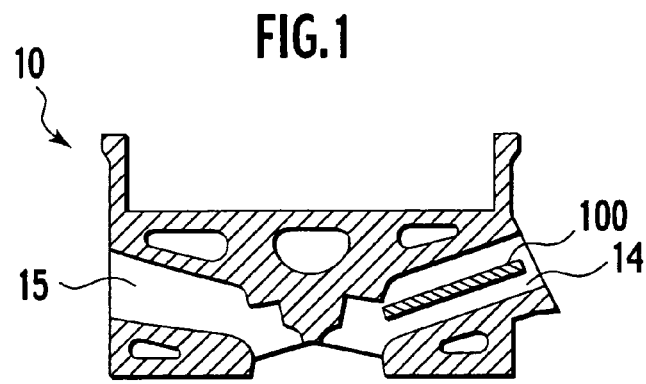
FIG. 1 is schematic cross sectional view illustrating a cylinder head of an engine.
Figure 2:
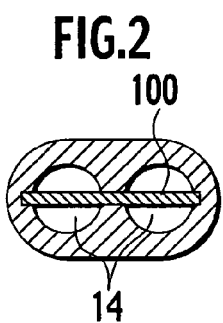
FIG. 2 is a cross sectional view taken along a line perpendicular to an axis of an intake port.
Figure 3:
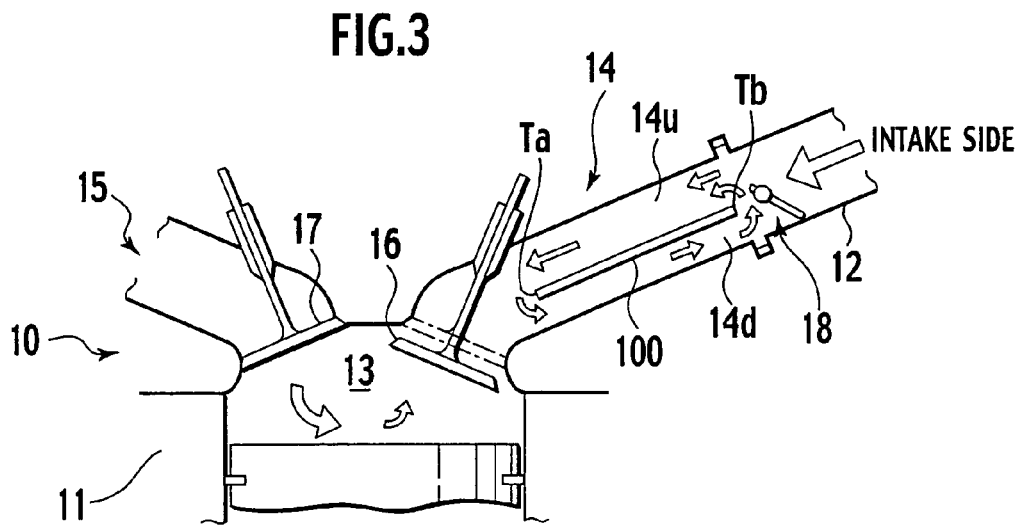
FIG. 3 is a schematic view illustrating a flow current condition inside the cylinder head.

Referring to FIGS. 1 and 3, the cylinder head 10 is formed on a top of a cylinder block 11 and includes a cylinder head body formed with the intake port 14 connected to an intake manifold 12 to introduce a stream of intake air which is composed of air and fuel gas, into a cylinder bore 13, and an exhaust port 15 from which exhaust gases resulting from combustion in the cylinder bore 13 are exhausted. Also, the engine shown in the drawings is one cylinder with four valves wherein two intake valves 16 and two exhaust valves 17 are incorporated.

Figure 4:
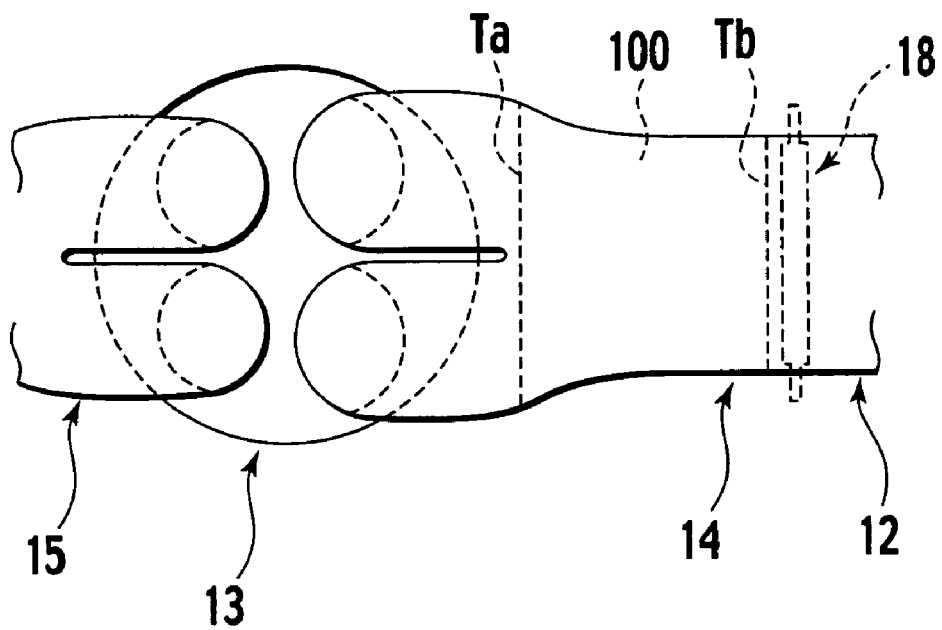
FIG. 4 is a schematic plan view of the cylinder head shown in FIG. 3.

The partition wall (tumble plate) 100 is formed inside the intake port 14, and the partition wall 100 extends, along a direction (indicated by a whitened arrow) in which intake air flows, from an intake side (right end side in FIG. 3) toward the cylinder bore 13. The intake manifold 12 is connected to the cylinder block 11 at the intake side of the partition plate 100, and a control valve 18 is disposed in the intake manifold 12 as shown in FIGS. 3 and 4. The intake port 14 is partitioned by the partition plate 100 into an upside port 14u and a downside port 14d. With the downside port 14d closed by the control valve 18, intake air flows through the upside port 14u at an accelerated speed, thereby forming strong tumble flow (vertical vortex flow) in the cylinder bore 13.

The intake port 14 has an area, closer to the cylinder bore 13, which is largely curved and, hence, depending upon a position of a cylinder-side distal end Ta of the tumble plate 100, a stream of intake air has varying characteristics, thereby remarkably influencing on a status in which the tumble stream is generated. For this reason, the position of the cylinder-side distal end Ta of the tumble plate 100 takes an extremely important position. In the meanwhile, since an intake-side distal end Tb of the tumble plate 100 serves as a side to split the intake air stream and assumes a position closer to the control valve 18, no variations occur in characteristics in air stream even in the presence of variations in locating positions of the distal end Tb. Thus, in general, no need arises for the intake-side distal end Tb to be placed in a more accurate locating position than that required for the cylinder-side distal end Ta.

With the presently filed embodiment, for the cylinder head 10 to be cast molded, the cylinder head 10 takes the form of a structure where the cylinder-side distal end Ta of the tumble plate 100 is fixed in place whereas the intake-side distal end Tb is made relatively free such that when the tumble plate 100 is subjected to thermal effects in pouring molten metal, the thermal effects are absorbed at the intake-side distal end Tb. That is, the locating precision of at least the cylinder-side distal end Ta is designed to lie at a given precision.

Figure 5A:
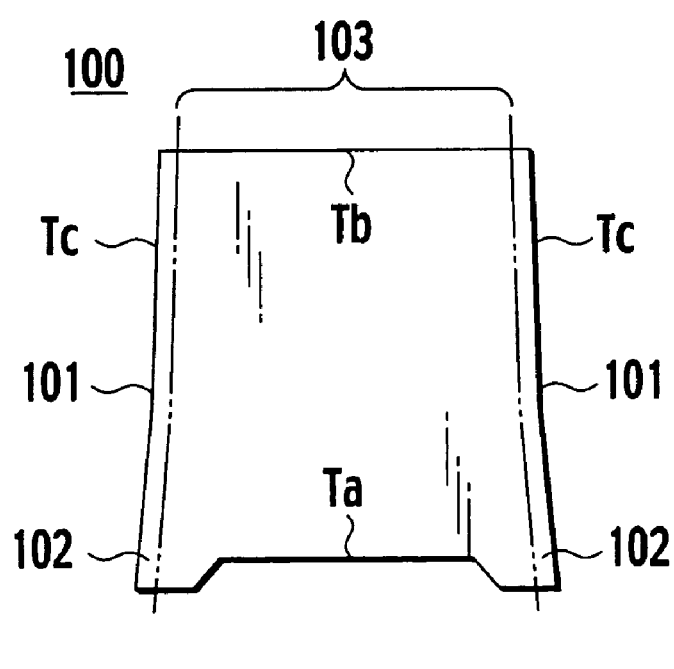
FIG. 5A is a plan view illustrating a tumble plate of an embodiment according to the present invention.
Figure 5B:
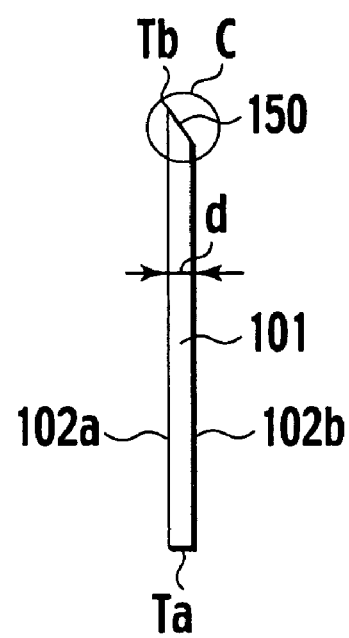
FIG. 5B is a side view of the tumble plate shown in FIG. 5A.

As shown in FIGS. 5A and 5B, the tumble plate 100 of the presently filed embodiment is preliminarily set in an intake-port forming sand core 200 (see FIGS. 6A to 7B), which will be described below, for forming the intake port 14 of the cylinder head 10 and is cast in by molten metal during the cast molding such that on cast molding, the intake port 14 of the cylinder head 10 is partitioned into plural ports (the upside port 14u and the downside port 14d). Also, throughout the following description, the intake-port forming sand core 200, in which the tumble plate 100 is preliminarily set, will be referred to as a "port core 200".

As shown in FIGS. 5A and 5B, more particularly, the tumble plate 100 has a substantially rectangular shape and is comprised of both side edges Tc adapted to be cast in by molten metal in cast molding the cylinder head 10, an intake-side distal end Tb contiguous with the both side edges Tc and formed in the intake port 14 upstream of an intake air stream, and the cylinder-side distal end Ta contiguous with the both side edges Tc and disposed downstream of the stream of intake air. As shown in FIG. 5A, the tumble plate 100 broadens towards the cylinder-side distal end Ta from the intake-side distal end Tb.

The tumble plate 100 has an inside section, inner than the both side edges Tc, which forms a partitioning section 103 by which the intake port 14 is partitioned. Reference numeral 102 designates a pair of side edges protruding outward from the partitioning section 103 to be cast in by molten metal when the cast molding is performed. Further reference numeral 101 designates a side surface of the tumble plate 100, which has the thickness d. The tumble plate 100 further comprises a top surface 102a and a bottom surface 102b. Meanwhile, as understood from FIG. 5A, the side edge protruding 102 is a portion of the top surface 102a and the bottom surface 102b.

The tumble plate 100 may be preferably made of material, such as aluminum alloy, on consideration of a recycling capability.

The thickness d of the side surface 101 of the tumble plate 100 may be preferably made small in consideration of reducing the resistance in intake air passing through the intake port 14. However, in case that, the tumble plate 100 is made of an aluminum alloy, the thickness d of the side surface 101 is preferably greater than 1.5 mm on consideration of a need to prevent thermal distortion caused by heat treatment of a cast product of the cylinder head 10.

As shown in FIG. 5B, of the cylinder-side distal end Ta and the intake-side distal end Tb spaced apart in a longitudinal direction of the tumble plate 100, the intake-side distal end Tb of the tumble plate 100 is formed with an acute-angled end face 150. By forming the acute-angle end face 150 on the intake-side distal end Tb, breaking of the port core 200 is induced at the acute-angle end face 150.

Further, the top surface 102a and the acute-angle end face 150 comprises a cutout portion C, and the acute-angled end face 150 is formed with the bottom surface 102b opposite to the top surface 102a, which a machining tool, such as a cutter, enters in subsequent processing. With such a structure, in machining an end face of the cylinder head 10, to which the intake manifold 12 is connected, with a cutter in subsequent processing after completing the cast molding of the cylinder head 10, the intake-side distal end Tb of the tumble plate 100 can be cut in a more smooth fashion, thereby precluding back burrs from occurring in the tumble plate 100 in subsequent processing.

Furthermore, although no particular limitation is intended for a method of manufacturing the tumble plate 100, the tumble plate 100 may be preferably fabricated by press forming in view of an ability of simply manufacturing products on a mass production basis at low costs.

Hereinafter, a mold 300 for a sand core molding machine by which the port core 200 is molded is referred to as a "core mold 300".

Figure 6A:
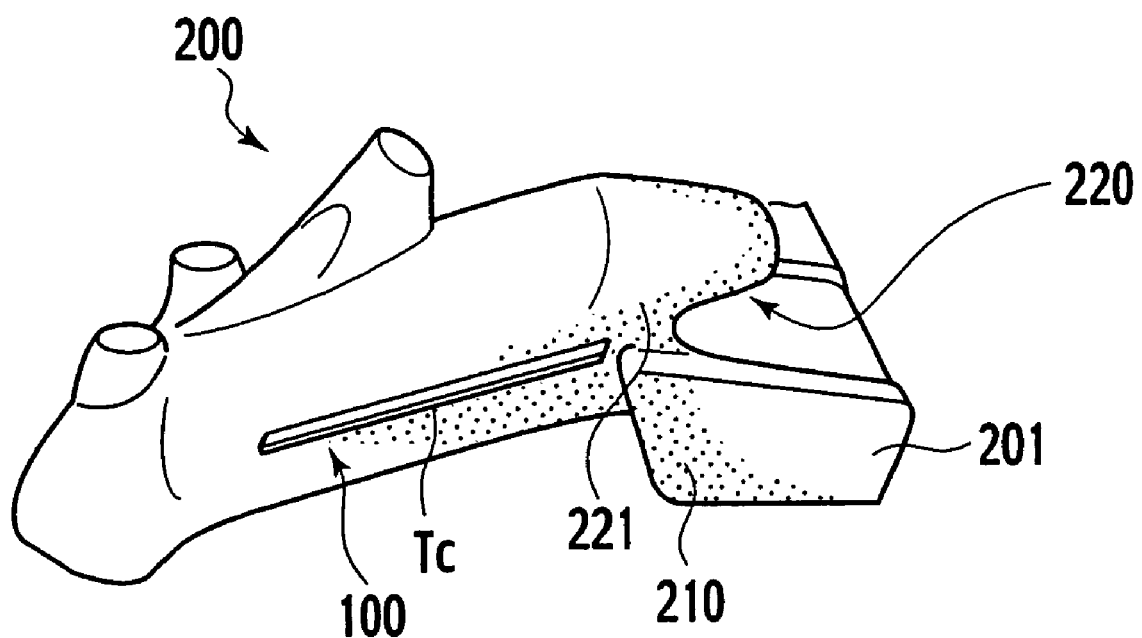
FIG. 6A is a perspective view illustrating the port core of the presently filed embodiment wherein the tumble plate is preliminarily set to allow a sand-ridded cavity portion and a molten metal stopper sand wall to be formed.
Figure 6B:
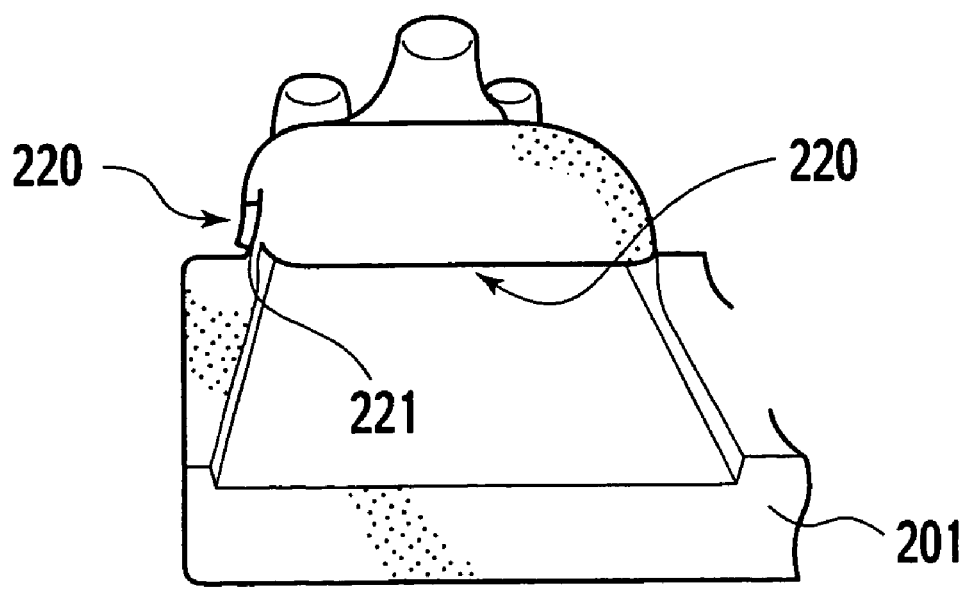
FIG. 6B is a perspective view illustrating the port core of shown in FIG. 6A wherein the port core is viewed from the sand-ridded cavity portion.
Figure 7A:
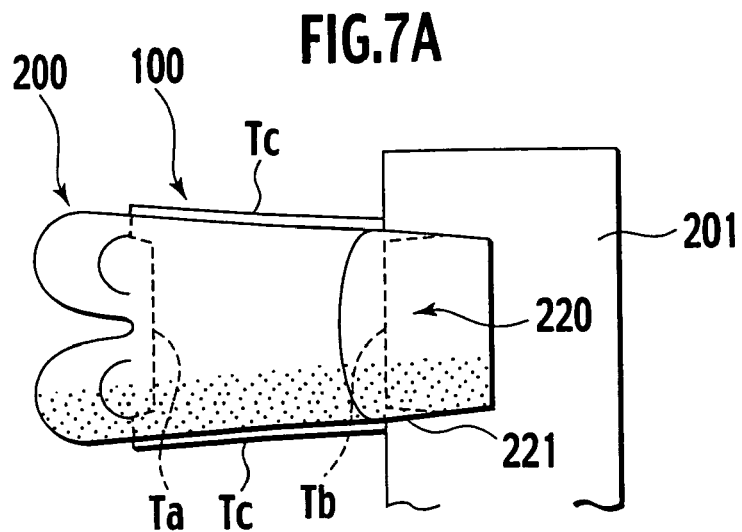
FIG. 7A is a plan view illustrating the port core.
Figure 7B:
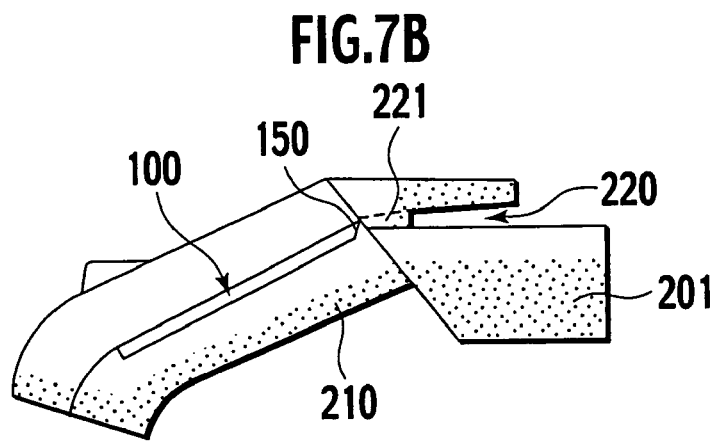
FIG. 7B is a side view of FIG. 7A.
Figure 8:
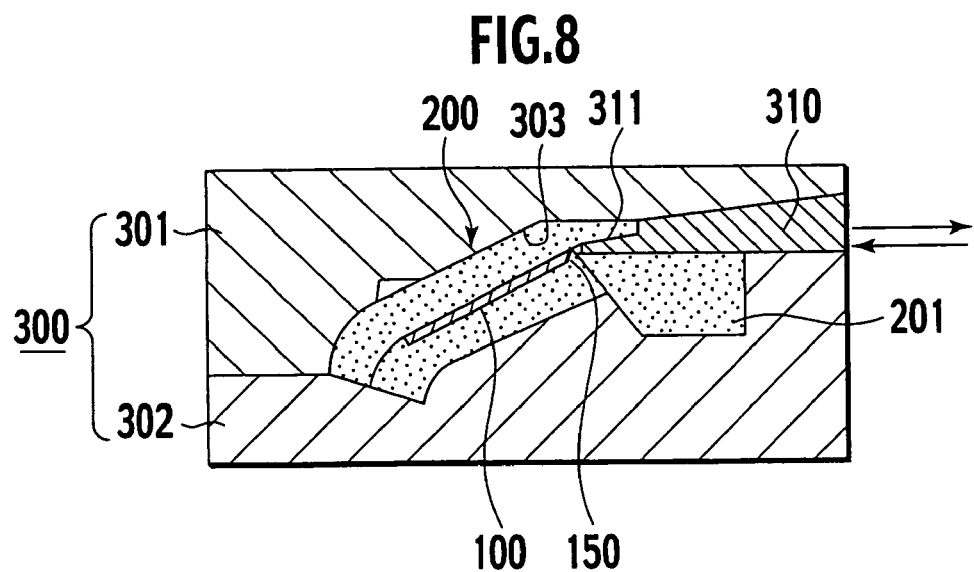
FIG. 8 is a schematic cross sectional view illustrating a sand core molding apparatus by which the port core is molded.

For the cylinder head 10 being cast molded, using the core mold 300 shown in FIG. 8 allows the port core 200, shown in FIGS. 6A to 7B, to be molded. As shown in FIGS. 6A and 6B, the port core 200 is generally comprised of a sand core body in which the partition plate 100 is preliminarily set in a manner described above.

The port core 200 is set in a casting mold 400 (see FIG. 12), by which the cylinder head 10 is cast molded for thereby forming the intake port 14 of the cylinder head 10. The port core 200 includes a sand core body that is preliminarily set in the core mold 300 such that both side edges Tc of the above-described tumble plate 100 protrude outward to be cast in by molten metal and the acute-angled end face 150 is located inside the core sand (see FIG. 7A).

The port core 200 has a core print 201 that is located in an outer area (hereinafter referred to as a "product-profile outside part") rather than an inside area (hereinafter referred to as a "product-profile inside part") in which the intake port 14 is cast. Although the product-profile inside part is apt to suffer from adverse affects, such as thermal degradation resulting from increased contact with molten metal, less contact occurs between molten metal and the core print 201 with a resultant reduction in adverse affects, caused by thermal degradation, on binders of the core sand 210 whereby in cast molding, the core print 201 serves as a member to provide a higher core strength than that of the product-profile inside part. For this reason, it is feared that due to thermal expansion of the tumble plate 100 in cast molding the cylinder head 10, the cylinder-side distal end Ta pressurizes the port core 200 to cause cracking or damages to the product-profile inside part. If the breaking of the sand core occurs in the product-profile inside part, it is extremely troublesome to perform deburring work in subsequent processing.

Therefore, the port core 200 of the presently filed embodiment has various features in that: (1) the core sand 210 takes a structure wherein sand is ridded from an area closer to the intake-side distal end Tb, i.e., the port core 200 has a thin wall thickness in the vicinity of the core sand 210, and (2) an area that has less strength than that of the product-profile inside part, in which deterioration occurs in strength due to thermal degradation, i.e., an area having the smallest strength in the port core 200, is set to the product-profile outside part in a positive and stable manner. Such a structure is intended to stably shift residual stress (casting stress), resulting from a difference in thermal expansions between the tumble plate 100 and the core sand 210, to the product-profile outside part.

That is, the port core 200 has a sand-ridded cavity portion (concave portion) 220 which is formed by reducing the thickness of a portion closer to the intake-side distal end Tb of the sand core body, and a molten metal stopper sand wall 221 that avoids the entry of molten metal into the sand-ridded cavity portion (conrave portion) 220. The sand-ridded cavity portion 220 plays a role as a cavity area that permits thermal expansion of the tumble plate 100, resulting from heat of molten metal, for thereby absorbing an increase in length caused by the expanding of the tumble plate 100. Also, the molten metal stopper sand wall 221 refers to a thin walled and elongated portion formed only by the core sand 210 and plays a role as a kind of a weir to preclude the entry of molten metal into the sand-ridded cavity portion 220. The sand-ridded cavity portion 220, the molten metal stopper sand wall 221 and detailed functions of these are described below in detail.

The both side edges Tc protruding outward from the tumble plate 100 are cast in by molten metal to cause the tumble plate 100 to be reliably retained. No particular limitation is intended on a cast-in width of the both side edges Tc and the cast-in width may preferably lie in a value of approximately 2 mm.

The tumble plate 100 is preliminarily set in the port core 200 of the presently filed embodiment in such a way to cause the acute-angled end face 150 to be positioned in the core sand 210 and, as viewed from the port core 200, the port core 200 has a cutout portion C (shown in FIG. 5B) formed at an area closer to the acute-angled end face 150. For this reason, stress concentrates at such an area with the cutout configuration, the port core 200 is apt to crack. The presence of thermal expansion of the tumble plate 100 in cast molding the cylinder head 10 causes the acute-angled end face 150 of the tumble plate 100 to extend and resulting stress arising from such extension can be concentrated onto the area related to the cutout portion C. This enables the occurrence of cracks to the port core 200 to be induced to an area closer to the intake-side distal end Tb with the acute-angled end face 150.

Burrs resulting from the cracks in the port core 200 do not occur in an inside of the cylinder head 10 but occur in the product-profile outside part. As a consequence, deburring work after the cast molding can be easily carried out or no need arises for carrying out such troublesome deburring work.

Referring again to FIG. 8, the core mold 300 is comprised of a core-forming upper half 301, a core-forming lower half 302, and a plurality of partial mold segments such as a loose piece 310. Arranging these partial mold segments to be brought into abutting engagement with one another results in the formation of a mold cavity 303 in which the port core 200 is formed. Core sand is blown into this mold cavity 303 and compacted to form the port core 200.

Figure 9A:
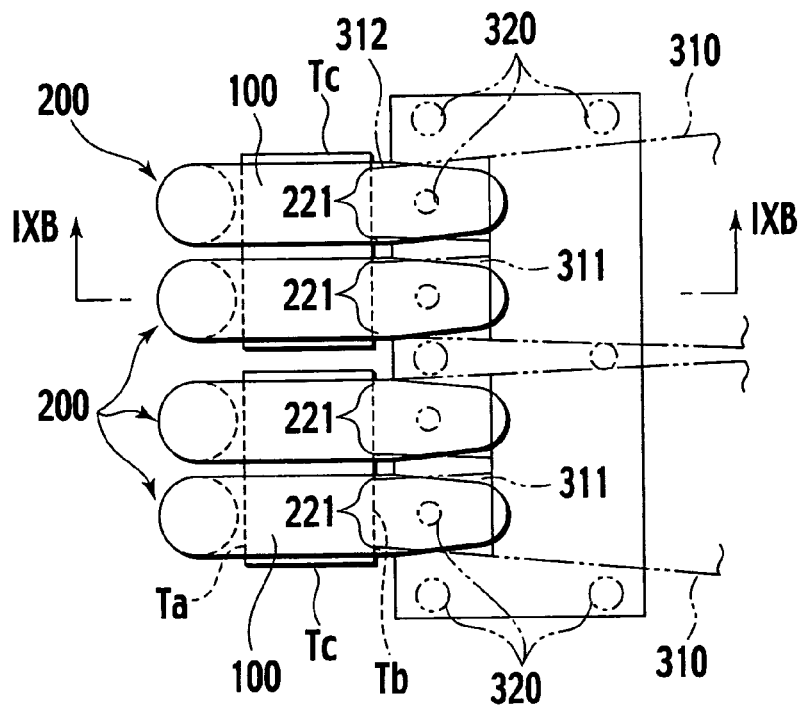
FIG. 9A is a schematic plan view for illustrating how the sand-ridded cavity portion is formed by a loose piece of the sand core molding apparatus.
Figure 9B:
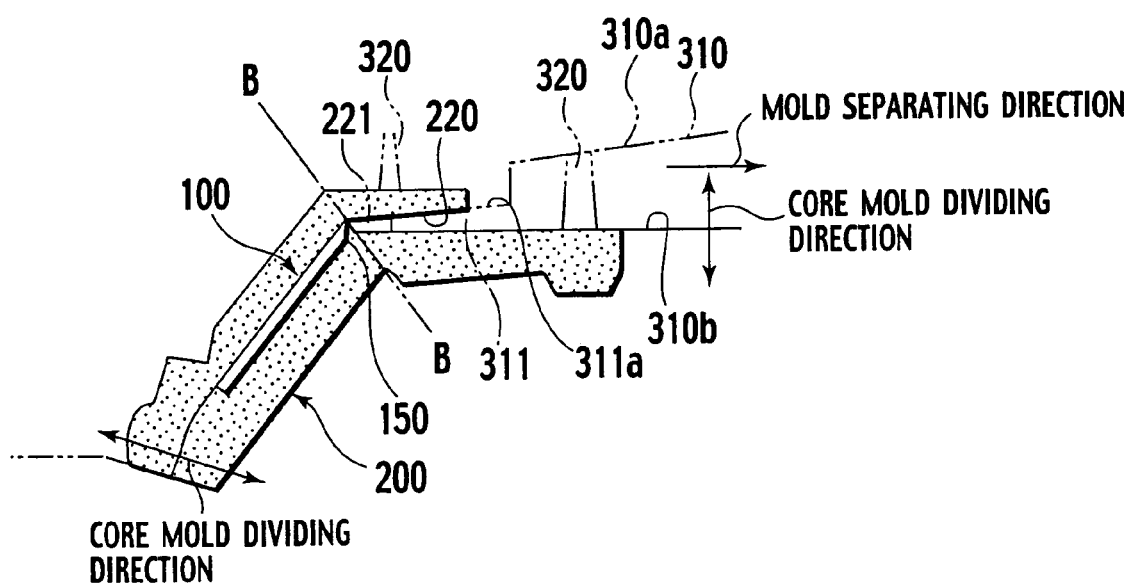
FIG. 9B is a cross sectional view taken along line IXB—IXB of FIG. 9A, and shows the state where the loose pierce is pulled from a port core.
Figure 10A:
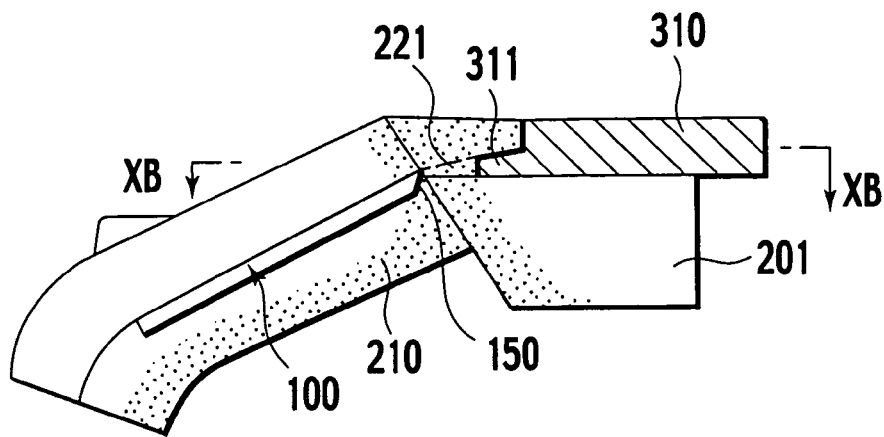
FIG. 10A is a schematic side view for illustrating how the molten metal stopper sand wall is formed by a loose piece of the sand core molding apparatus.

With the presently filed embodiment, a plate-like moveable loose piece 310 is employed for the purpose of forming the sand-ridded cavity portion 220 and the molten metal stopper sand wall 221 as shown in FIGS. 9A, 9B (in which reference numeral 320 designates a blowing port through which core sand is blown) and FIG. 10. The loose piece 310 is made freely moveable in a direction toward the intake-side distal end Tb of the tumble plate 100 placed in the mold and has a sand ridging portion 311 to form the concave portion 220 in the core sand 210 at the area closer to the intake-side distal end Tb. In addition, a sand wall forming surface 312 for forming the molten stopper sand wall 221 is formed with the loose piece 310. The molten stopper sand wall 221 precludes the entry of molten metal into the sand-ridded cavity portion (concave portion) 220 that will be formed in the port core 200.

More particularly, the loose piece 310 is indicated by a double dot line in FIGS. 9A and 9B and has a distal end, which is shown in a left side of the drawing figures, formed with the sand ridging portion 311 with a size corresponding to the sand-ridded cavity portion (concave portion) 220. The loose piece 310 has an upper surface 311a that is formed in a tapered shape, and a lower surface 310b. The lower surface 310b of the loose piece 310 is formed in a substantially horizontal plane to allow the loose piece 310 to freely slide with respect to the upper surface of the core lower half 302. With the port core 200 molded, the loose piece 310 is set to remain in a condition under which the distal end of the sand ridging portion 311 is held in abutting engagement with the intake-side distal end Tb of the tumble plate 100.

Figure 10B:
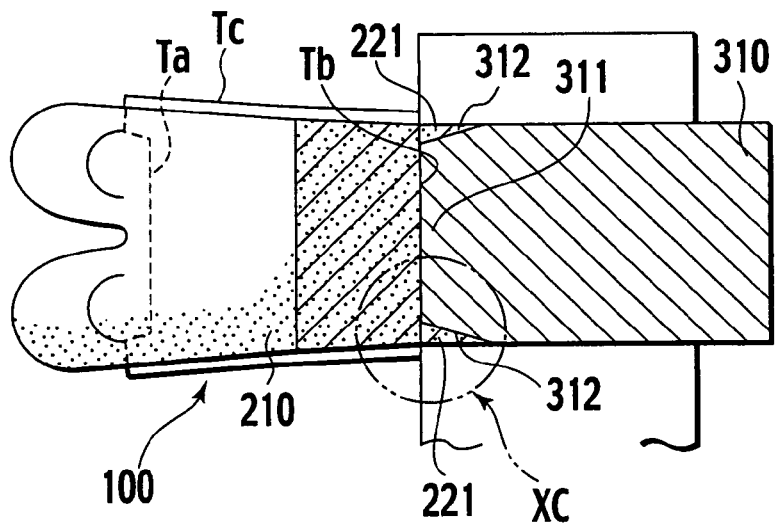
FIG. 10B is a cross sectional view taken along line XB—XB of FIG. 10A.
Figure 10C:
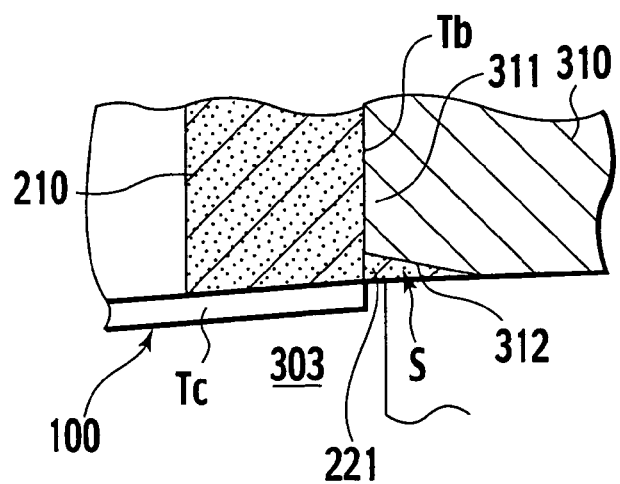
FIG. 10C is a detailed view of an area encircled by XC of FIG. 10B.

With reference to FIG. 10B, the sand wall forming surface 312 that is formed with the loose piece 310 and is formed in a tapered end. As shown in FIG. 10C, the sand wall forming surface 312 defines a space S for forming the molten metal stopper sand wall 221 (shown in FIG. 6A).

Figure 11A:
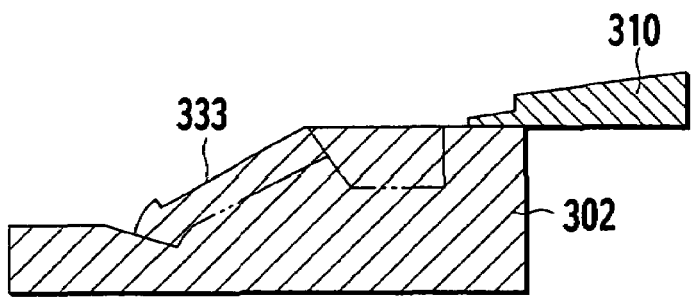
FIGS. 11A to 11E are views illustrating a molding procedure of the port core using the sand core molding apparatus shown in FIG. 8.
Figure 11B:
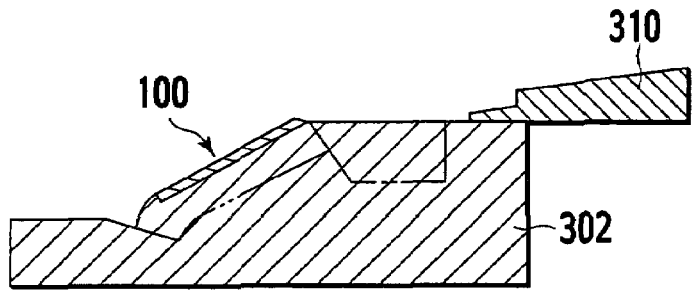

Referring to FIGS. 11A and 11B, when the port core 200 is molded, first, the tumble plate 100 is set on a rest 333 of the core-forming lower half 302 under a condition where the loose piece 310 is retracted to rearward of the core-forming lower half 302.

Figure 11C:
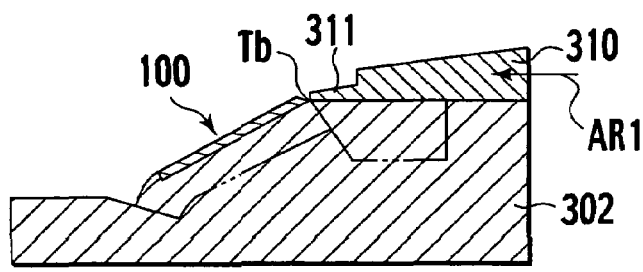

Then, the loose piece 310 is moved along a direction AR1 to cause the distal end of the sand ridding portion 311 is brought into abutting engagement with the intake-side distal end Tb of the tumble plate 100 (see FIG. 11C).

Figure 11D:
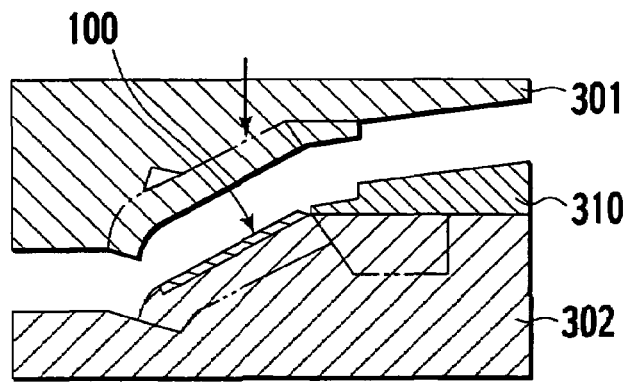
Figure 11E:
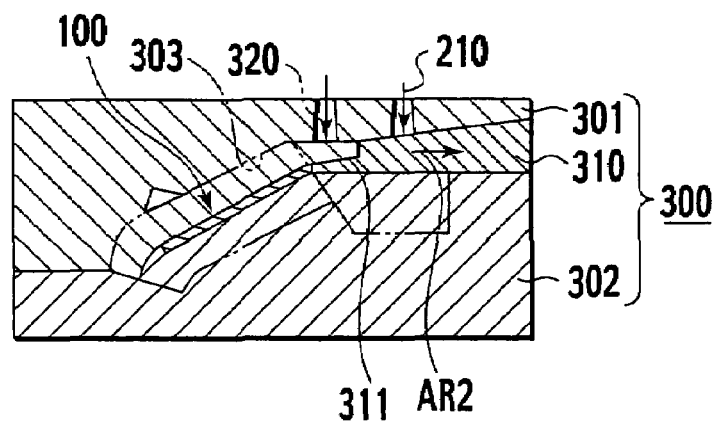

Next, the core-forming upper half 301 is placed over the core-forming lower half 302 to form the mold cavity 303, to which core sand 210 is blown through the sand blowing port 320 (see FIGS. 11D and 11E).

Then, the core sand 210 is compacted and, thereafter, the core-forming upper half 301 is opened to separate the core mold 300. When this takes place, the loose piece 310 is moved in a direction (as shown by an arrow AR2) perpendicular to a direction in which the core mold 300 is divided, and separated from the core-forming lower half 302 (see FIGS. 9A and 9B). This allows the molded port core 200 to be taken out from the core mold 300.

The port core 200, thus molded in such a way, is formed with the sand-ridded cavity portion (concave portion) 220 by the sand ridding portion 311 of the loose piece 310 and the molten metal stopper sand wall 221 by the sand wall forming surface 312 of the loose piece 310. Further, the sand-ridded cavity portion (concave portion) 220 is formed so as to extend in a horizontal direction from the intake-side distal end Tb of the tumble plate 100 through displacement of the loose piece 310. Here, a line B—B of FIG. 9B indicate a surface that is subjected to subsequent machining. As set forth above, with the port core 200 of the presently filed embodiment, the port core 200 is designed to have an area, to be ridded through processing, that is apt to relatively break. That is, since the port core 200 has one part, that is easily breakable, and the other part, that is subjected to the machining operation, on the same side, it becomes easy for the port core 200 to be corrected after the molding while enabling reduction in deterioration in defective products.

Figure 12:
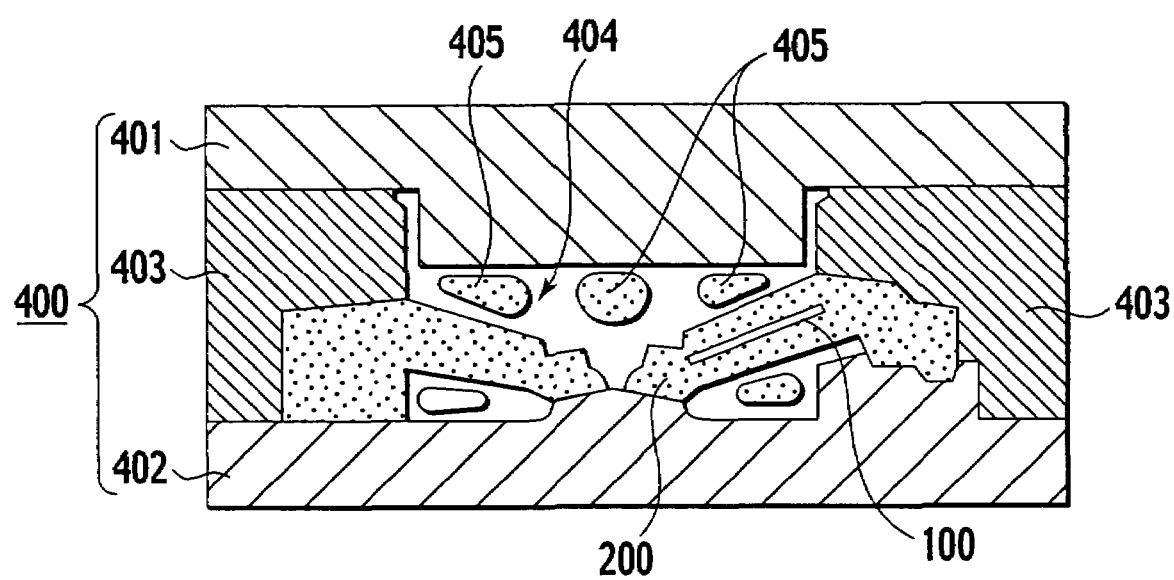
FIG. 12 is a cross sectional view illustrating a casting mold under a condition where the port core is set for casting a cylinder head.

Referring to FIG. 12, the molded port core 200 is set in the casting mold 400 for molding the cylinder head 10. The casting mold 400 is comprised of an upper half 401, a lower half 402 and side mold segments 403. The port core 200 is supported between the lower half 402 and the side mold segments 403 and when these mold segments 402, 403 are covered with the upper half 401, the casting mold 400 is internally formed with a mold cavity 404 for molding the cylinder head 10. Also, reference numeral 405 in the drawing figure designates cores for forming a water jacket. Examples of casting methods may include a low-pressure die-casting method (LPDC).

Under such a condition, pouring molten metal, such as aluminum alloy or other metal into the mold cavity 404 through a pouring port (not shown) allows the cylinder head 10, as shown in FIG. 1, to be molded. During such pouring, the tumble plate 100, provided in the port core 200, is caused to thermally expand due to heat resulting from molten metal.

With the presently filed embodiment, the acute-angled end face 150 is formed at the intake-side distal end Tb that forms the side at which the port core 200 is caused to break. As viewed from the port core 200, the port core 200 has the area, closer to the acute-angled end face 150, that is formed in the cutout whereby when the tumble plate 100 thermally expands due to heat resulting from molten metal, the acute-angled end face 150 extends, thereby causing residual stress resulting from such extending to be concentrated to the area around the cutout portion C. This enables the cracking of the port core 200 to be induced or guided at the area closer to the intake-side distal end Tb formed in the acute-angled end face 150. The burrs resulting from the cracking of the port core 200 do not occur inside the cylinder head 10 as the cast product after completing the cast molding but occur in the product-profile outside part closer to the intake manifold with no influence on a product performance. Accordingly, subsequent deburring work can be easily carried out or the burrs can be removed simultaneously with finish working and no need arises for carrying out such deburring work.

Further, the port core 200 is formed with the sand-ridded cavity portion (concave portion) 220, formed of the thinned wall of the port core 210 at the area closer to the intake-side distal end Tb, by which a strength of the area closer to the intake-side distal end Tb is made lower than that of the area closer to the cylinder-side distal end Ta in the presence of the sand-ridded cavity portion 220. For this reason, it becomes possible for the direction in which the tumble plate 100 is caused to thermally expand due to heat of molten metal to be limited or restricted in one direction toward the intake-side distal end Tb from the cylinder-side distal end Ta. As thermal expansion of the tumble plate 100 is intensively collected at the area closer to the intake-side distal end Tb, casting stress concentrates at the area closer to the acute-angled end face 150 in coupled effect with the above action, enabling the cracking of the port core 200 to be further reliably induced at the area closer to the intake-side distal end Tb formed in the acute-angled end face 150. With such a structure, inducing the burrs, resulting from the cracking of the core, to occur in a further limited area, i.e., inducing the burrs to occur in the product-profile outside part enables deburring work to be easily performed in subsequent machining operation.

As set forth above, with the presently filed embodiment, even in the presence of thermal expansion of the tumble plate 100, the tumble plate 100 is cast in with molten metal at the areas of the cylinder-side distal end wall Ta, forming an important position, under a condition remaining in a desired precision. Accordingly, displacement of the tumble plate 100 and looseness of the product in the product-profile inside part can be minimized, resulting in improvement over a quality of the product. Additionally, the burrs resulting from the cracking of the port core 200 are enabled to occur in a limited range, thereby achieving deburring work to be easily done during subsequent machining.

Figure 13A:
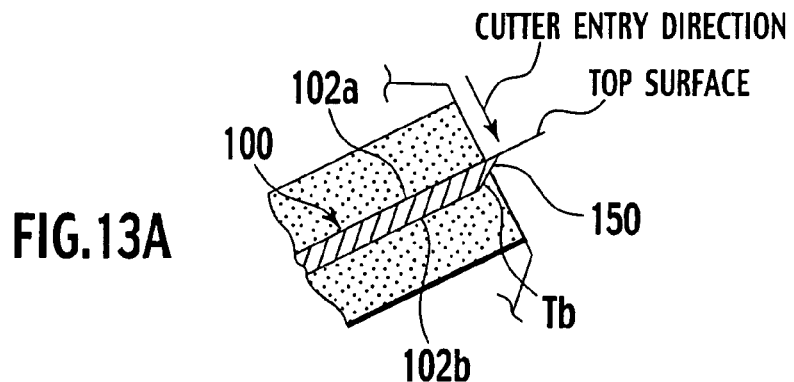
FIG. 13A is a schematic view illustrating a status where during subsequent machining after cast molding the cylinder head, an end face of the cylinder head, closer to an intake-side distal end, to which an intake manifold is connected, is machined.

As shown in FIG. 13A, the acute-angled end face 150 of the tumble plate 150 is formed on the bottom surface 102b which is opposite to the top surface 102a which a machining tool, such as a cutter, is penetrated. With such a positional relationship between the acute-angled end face 150 and the machining tool, reduction occurs in machining resistance during machining such as grinding the intake-side distal end Tb of the tumble plate 100, thereby suppressing deformation of the tumble plate 100 and the generation of noises. In addition, the presence of the acute-angled end face 150 provided on one side opposite to the other side, in which the machining tool is caused to enter, that has a flat surface enables back burrs resulting from machining to be suppressed from being generated.

Figure 13B:
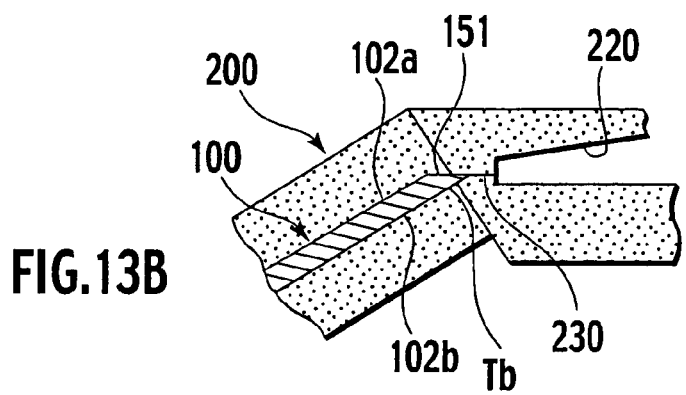
FIGS. 13B and 13C are schematic views illustrating another embodiments of the acute-angled end face of the tumble plate.
Figure 13C:
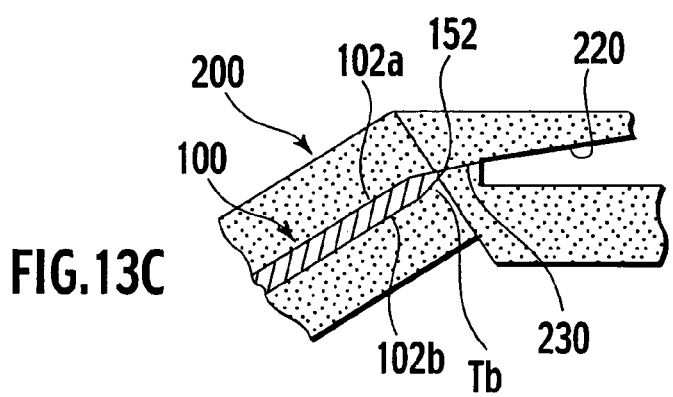

According to the present invention, further, it may be possible to employ any one of an acute-angled end face 151 (see FIG. 13B) on a side opposite to that of FIG. 13A and an acute-angled end face 152 (see FIG. 13C) that is tapered on both sides of the end face in the thickness direction. In any structures of these embodiments, a core breaking 230 can be induced at the intake-side distal end Tb and, additionally, it becomes possible to reduce machining resistance occurring when machining the intake-side distal end Tb during machining process subsequent to machining, enabling deformation and noises to be prevented from being generated.

Figure 14:
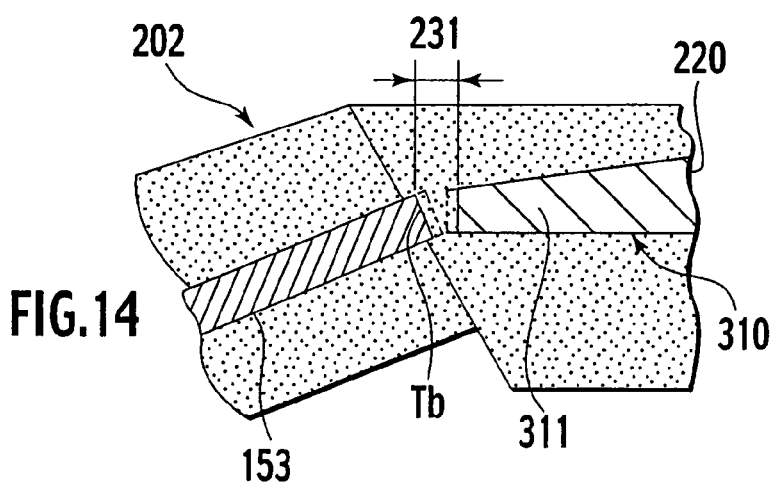
FIG. 14 is a schematic view illustrating an example of defects occurring in the port core related to a comparative example wherein a tumble plate with no acute-angled end face is set.

Meanwhile, heretofore, as shown in FIG. 14, there are probabilities where due to displacement of a loose piece 310 by which the sand-ridded cavity portion (concave portion) 220 is formed in the port core 202, wear of the core mold 300 and variation in dimension of a tumble plate 153, a residual volume 231 of the core sand 210 between the intake-side distal end Tb of the tumble plate 153 and the sand-ridded cavity portion 220 increases.

With the such related art where no acute-angled end face is formed on the tumble plate 153, as resistance of the core sand 210 increases at the side closer to the intake-side distal end Tb, the tumble plate 153 thermally expands toward the intake-side distal end Tb to cause the core breaking inside the product-profile inside part for thereby causing fears for subsequent deburring work to be extremely troublesome.

On the contrary, with the presently filed embodiment, even in the presence of an increase in resistance of the core sand 210 resulting from an increase in the residual volume of the core sand 210 as a cause for productive variations, stress arising from thermal expansion of the tumble plate 100 concentrates at the distal end Tb of the acute-angled end face 150. This enables the cracking of the port core 200 to be induced at the side, provided with the acute-angled end face 150, which is closer to the intake-side distal end Tb, resulting in a capability of easily carrying out subsequent deburring work.

Thus, the present invention makes it possible to stably induce the core breaking at the area closer to the intake-side distal end Tb, where no adverse affect occurs on a product profile, even in the presence of variation in the residual sand volume due to sudden burst or deterioration with the passage of time in continuous production.

Also, although the present invention has been described with reference to an exemplary structure wherein the tumble plate 100 is used as the cast-in object plate member, the present invention is not limited to such a structure and the present invention may be widely applied to cast-in object plate members that are preliminarily set in the sand core to be cast in during the cast molding of cast products for limiting areas in which burrs occur as a result of cracking of the core for thereby achieving to provide an ease of deburring work during subsequent machining.

Although the present invention has been described above by reference to certain embodiments of the present invention, the invention is not limited to the embodiments described above and will occur to those skilled in the art, in light of the teachings. The scope of the invention is defined with reference to the following claims.

What is claimed is:

1. An intake-port forming sand core, for forming an intake port of a cylinder head, which is set in a casting mold for cast molding the cylinder head, the intake-port forming sand core comprising:
   a sand core body; and
   a partition plate, for the intake port of the cylinder head, which is preliminarily set in the sand core body and cast in during cast molding of the cylinder head to partition the intake port into a plurality of ports;
   wherein the partition plate includes:
   an intake-side distal end;
   a cylinder-side distal end;

a partitioning section formed between the intake-side distal end and the cylinder-side distal end;

a pair of side edges protruding outward from the partitioning section to be cast in by molten metal when the cast molding is performed; and wherein at least one of the intake-side distal end and the cylinder-side distal end of the partitioning plate includes an acute-angled end face to promote breaking in the sand core body; and wherein the sand core body includes a concave portion which is formed by reducing the thickness of a portion of the sand core body.

2. The intake-port forming sand core according to claim 1, wherein:

the partition plate has end faces in a thickness direction and the acute-angled end face is formed on one of the end faces at the intake-side distal end in opposition to the other one of the end faces on which a machining tool is caused to enter.

3. A cylinder head for an engine, comprising:

a cylinder head body;

an intake port which is formed by an intake-port forming sand core having a sand core body including a concave portion which is formed by reducing the thickness of a portion of the sand core body; and a partition plate which is preliminarily set in the sand core body and cast in during cast molding of the cylinder head to partition the intake port into a plurality of ports, and which includes an intake-side distal end, a cylinder-side distal end, a partitioning section formed between the intake-side distal end and the cylinder-side distal end, and a pair of side edges protruding outward from the partitioning section to be cast in by molten metal when the cast molding is performed;

wherein at least one of the intake-side distal end and the cylinder-side distal end of the partitioning plate includes an acute-angled end face: and wherein the acute-angled end face of the partition plate and the concave portion of the sand core induce burrs resulting from a cracking of the intake-port forming sand core at an area closer to the intake-side distal end.

4. The cylinder head according to claim 3, wherein:

the partition plate has end faces in a thickness direction and the acute-angled end face is formed on one of the end faces at the intake-side distal end in opposition to the other one of the end faces on which a machining tool is caused to enter.

* * * * *